United States Patent
Chaudhuri et al.

(10) Patent No.: US 9,882,640 B1
(45) Date of Patent: Jan. 30, 2018

(54) VISIBLE LIGHT COMMUNICATION PERSONAL AREA NETWORK COORDINATOR (VPANC) AND ASSOCIATED METHOD FOR SELECTING SUITABLE VPANCS

(71) Applicant: Wipro Limited, Bangalore (IN)

(72) Inventors: Saptarshi Chaudhuri, Bangalore (IN); Avijit Manna, Kolkata (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 15/372,675

(22) Filed: Dec. 8, 2016

(30) Foreign Application Priority Data

Oct. 28, 2016 (IN) .............................. 201641037176

(51) Int. Cl.
*H04B 10/116* (2013.01)
*H04B 10/27* (2013.01)
(Continued)

(52) U.S. Cl.
CPC ..... *H04B 10/116* (2013.01); *H04B 10/07953* (2013.01); *H04B 10/27* (2013.01); *H04W 48/18* (2013.01); *H04W 64/006* (2013.01)

(58) Field of Classification Search
CPC .... H04J 14/0227; H04J 3/0682; H04B 10/00; H04B 10/077; H04B 10/07955;
(Continued)

(56) References Cited

U.S. PATENT DOCUMENTS

2015/0126200 A1    5/2015    Wang et al.
2015/0319639 A1    11/2015    Poola et al.
(Continued)

FOREIGN PATENT DOCUMENTS

EP    2 953 277    12/2015
EP    3 010 284    4/2016

OTHER PUBLICATIONS

Extended European International Search Report issued in the European Patent Office in counterpart European Application No. 17153599.0, dated Jul. 4, 2017, 10 pages.
(Continued)

*Primary Examiner* — Ted Wang
(74) *Attorney, Agent, or Firm* — Finnegan, Henderson, Farabow, Garrett & Dunner, LLP

(57) ABSTRACT

Visible light communication Personal Area Network Coordinators (VPANCs) and associated method for selecting VPANCs is disclosed. The method includes receiving, by a VPANC, channel scan parameters and VPANC controlling parameters created for the VPANC from a controller and End User Devices (EUD) information from each of a plurality of EUDs associated with the VPANC; creating, by the VPANC, a set of customized channel scan parameters and a VPANC selection policy for each of the plurality of EUDs based on the channel scan parameters, the VPANC controlling parameters, and the EUD information; and sharing, by the VPANC, with each EUD of the plurality of EUDs, an associated set of customized channel scan parameters and VPANC selection policy, wherein sharing enables an EUD to select a new VPANC from the plurality of VPANCs.

21 Claims, 7 Drawing Sheets

(51) Int. Cl.
*H04W 48/18* (2009.01)
*H04B 10/079* (2013.01)
*H04W 64/00* (2009.01)

(58) Field of Classification Search
CPC .................. H04B 10/116; H04B 10/27; H04B 10/07953; H04W 48/18; H04W 64/006
See application file for complete search history.

(56) References Cited

U.S. PATENT DOCUMENTS

2016/0142967 A1   5/2016  Lee
2016/0183172 A1*  6/2016  Lee ........................ H04W 48/06
                                                                           370/329

OTHER PUBLICATIONS

Anurag Sarkar et al., "Li-Fi Technology: Data Transmission through Visible Light", *IJARCSMS*, vol. 3, Issue 6; Jun. 2015, pp. 1-12.

\* cited by examiner

VISIBLE LIGHT COMMUNICATION PERSONAL AREA NETWORK COORDINATOR (VPANC) AND ASSOCIATED METHOD FOR SELECTING SUITABLE VPANCS

TECHNICAL FIELD

This disclosure relates generally to Light Fidelity (Li-Fi) networks and more particularly to Visible light communication Personal Area Network Coordinator (VPANC) and associated method for selecting suitable VPANCs.

BACKGROUND

As the number of users of existing wireless communication technologies (for example, Wi-Fi) are increasing, availability of radio spectrum has become a challenge. Deployment of these new age wireless technologies also consume massive energy, which is a threat to the environment. Moreover, these technologies are not suitable under certain conditions (for example, under water or within airplanes).

Some of the above discussed problems are solved by Light-Fidelity (Li-Fi) technology, which is a wireless technology that proposes use of visible light as a media for data transfer and communication. However, existing techniques providing Visible Light Communication (VLC) in LI-Fi network suffer from many drawbacks that include, delay in channel scan, unnecessary power consumption by an End User Device (EUD) due to wrong channel scan, unsuitable selection of a VLC Personal Area Network Coordinator (VPANC), incomplete channel scan for the EUD in case of shorter channel scan duration, increased power consumption in the EUD in case of longer channel scan duration, selection of an unsuitable VPAN having poor quality channel that will affect throughput for an end user, limited mobility within the VPAN, and drop in connection due to dead zones between two VPANs.

There is therefore a need for a mechanism that provides suitable VPAN selection and quality of coverage in terms of connection and throughput for EUD mobility across VPANs.

SUMMARY

In one embodiment, a method for selecting Visible light communication Personal Area Network Coordinators (VPANCs) is disclosed. The method includes receiving, by a VPANC, channel scan parameters and VPANC controlling parameters created for the VPANC from a controller and End User Devices (EUD) information from each of a plurality of EUDs associated with the VPANC, wherein the channel scan parameters and the VPANC controlling parameters are created by the controller based on VPANC information received from a plurality of VPANCs that includes the VPANC, the VPANC controlling parameters are associated with VPANCs and dead zones neighboring the VPANC; creating, by the VPANC, a set of customized channel scan parameters and a VPANC selection policy for each of the plurality of EUDs based on the channel scan parameters, the VPANC controlling parameters, and the EUD information; and sharing, by the VPANC, with each EUD of the plurality of EUDs, an associated set of customized channel scan parameters and VPANC selection policy, wherein sharing enables an EUD to select a new VPANC from the plurality of VPANCs.

In another embodiment, a VPANC in a Light Fidelity (Li-Fi) network is disclosed. The VPANC includes a network interface communicatively coupled to a controller and a plurality of EUDs; a processor; and a memory storing instructions that, when executed, cause the processor to perform operations comprising: receiving channel scan parameters and VPANC controlling parameters created for the VPANC from a controller and EUD information from each of a plurality of EUDs associated with the VPANC, wherein the channel scan parameters and the VPANC controlling parameters are created by the controller based on VPANC information received from a plurality of VPANCs that includes the VPANC, the VPANC controlling parameters are associated with VPANCs and dead zones neighboring the VPANC; creating a set of customized channel scan parameters and a VPANC selection policy for each of the plurality of EUDs based on the channel scan parameters, the VPANC controlling parameters, and the EUD information; and sharing with each EUD of the plurality of EUDs, an associated set of customized channel scan parameters and VPANC selection policy, wherein sharing enables an EUD to select a new VPANC from the plurality of VPANCs.

In yet another embodiment, A non-transitory computer-readable storage medium having stored thereon, a set of computer-executable instructions for selecting VPANCs is disclosed, causing a computer comprising one or more processors to perform steps comprising: receiving channel scan parameters and VPANC controlling parameters created for the VPANC from a controller and EUD information from each of a plurality of EUDs associated the VPANC, wherein the channel scan parameters and the VPANC controlling parameters are created by the controller based on VPANC information received from a plurality of VPANCs that includes the VPANC, the VPANC controlling parameters are associated with VPANCs and dead zones neighboring the VPANC; creating a set of customized channel scan parameters and a VPANC selection policy for each of the plurality of EUDs based on the channel scan parameters, the VPANC controlling parameters, and the EUD information; and sharing with each EUD of the plurality of EUDs, an associated set of customized channel scan parameters and VPANC selection policy, wherein sharing enables an EUD to select a new VPANC from the plurality of VPANCs.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
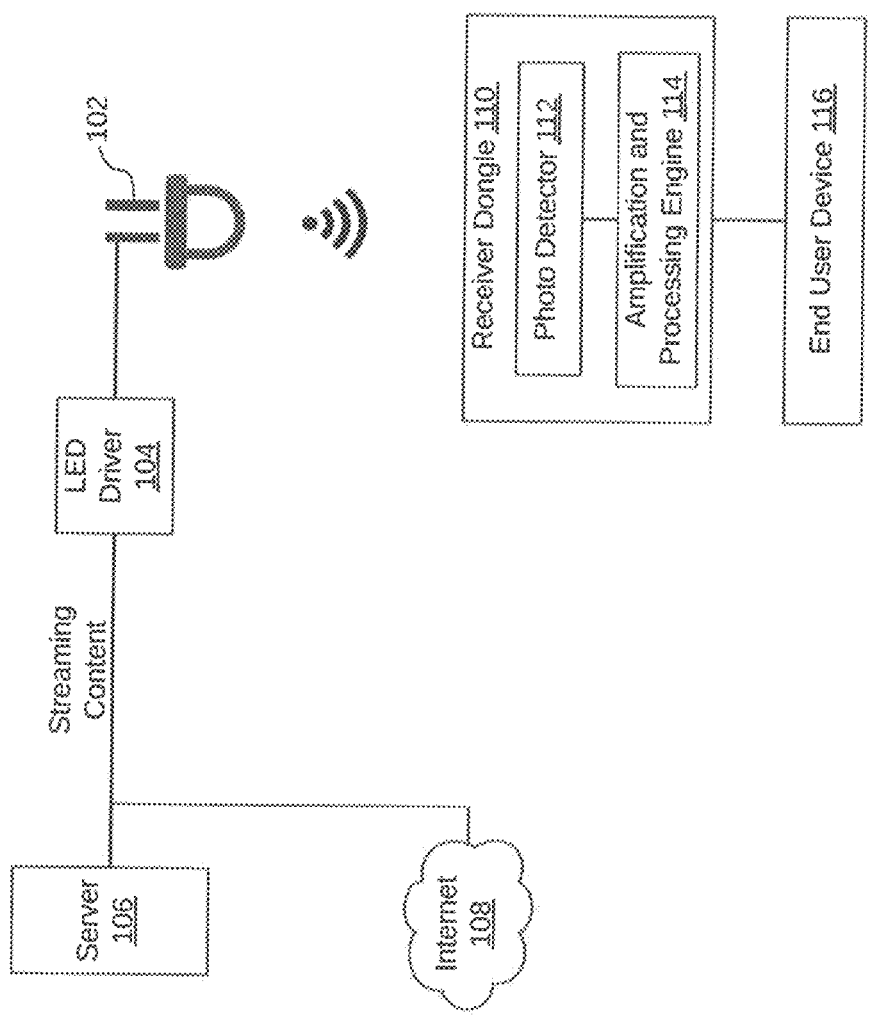
FIG. 1 illustrates a block diagram of an exemplary Light Fidelity (Li-Fi) network in which various embodiment may function.

Additional illustrative embodiments are listed below. In one embodiment, a block diagram of a Light Fidelity (Li-Fi) network 100 (that is exemplary) is illustrated In FIG. 1, in which various embodiment may function. Li-Fi network 100 includes a plurality of Light Emitting Diodes (LED) lamps (for example, LED lamp 102) that is controlled by an LED driver 104. LED driver 104 turns LED lamp 102 'ON' to transmit a digital 1 and turns LED lamp 102 'OFF' to transmit a digital 0. LED lamp 102 is rapidly turned 'ON' and 'OFF' to transmit data, which may be streamed from a server 106 and/or the Internet 108. The streamed data is passed though LED driver 104, which varies the rate at which LED lamp 102 is flickered in order to encode and transmit the streamed data. It will be apparent to a person skilled in the art that multiple such LED lamps may be used to encode and transmit data. It will be further apparent to a person skilled in the art that combination of different color LED lamps (for example, red, green, and blue) may be used to alter frequency of light, such that each frequency encodes a different data channel.

The encoded data transmitted by LED lamp 102 is received by a receiver dongle 110 that includes a photo detector 112 and an amplification and processing engine 114. Photo detector 112 is a light sensitive device that decodes the flickering rate of LED lamp 102 and converts it back to the streamed data for consumption by an End User Device (EUD) 116. After conversion though, amplification and processing engine 114 further processes and amplifies the streamed data in order to share it with EUD 116. It will be apparent to a person skilled in the art that multiple EUDs may be in communication with receiver dongle 110. Examples of EUD 116 may include, but are not limited to a smartphone, a laptop, a tablet, a phablet, a computer, a gaming console, a set-top box, and an Internet of Things (IoT) enabled smart device that has wireless connectivity. It will also be apparent to a person skilled in the art that receiver dongle 110 may be a part of EUD 116.

Figure 2:
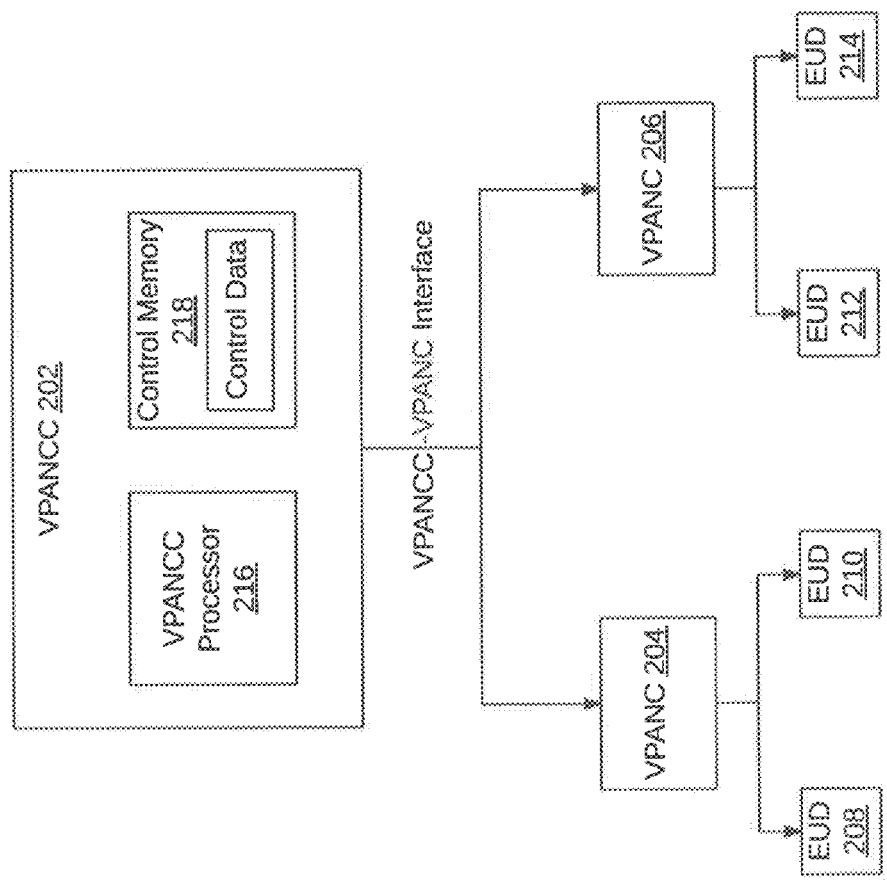
FIG. 2 is a block diagram illustrating a Li-Fi network comprising a Visible light communication Personal Area Network Coordinator Controller (VPANCC), in accordance with an embodiment.

Referring now to FIG. 2, a block diagram of a Li-Fi network 200 comprising a Visible light communication Personal Area Network Coordinator Controller (VPANCC) 202 is illustrated, in accordance with an embodiment. VPANCC 202 includes a network interface (not shown in FIG. 2) to keep it communicatively coupled to a plurality of VPANCs through a VPANCC-VPANC interface, which is a bi-directional interface. The plurality of VPANCs include a VPANC 204 and a VPANC 206, which are neighboring VPANCs. VPANCC 202 also uses a VPANCC configuration interface to communicate with an Operations Administration and Maintenance (OAM) entity to receive configuration parameters and send system level feedback to the OAM entity.

Each of the plurality of VPANCs is further communicatively coupled to a plurality of EUDs. In this embodiment, VPANC 204 is communicatively coupled to an EUD 208 and an EUD 210 that are within the coverage area of VPANC 204. Similarly, VPANC 206 is communicatively coupled to an EUD 212 and an EUD 214 that are within the coverage area of VPANC 206.

VPANCC 202 coordinates with VPANC 204 and VPANC 206 to collect VPANC information from each of VPANC 202 and VPANC 204 using the VPANCC-VPANC interface. The VPANC information collected from a VPANC may include neighboring VPANC information, geo-location of the VPANC, current load on the VPANC, backhaul throughput configured for the VPANC, and currently used backhaul throughput by the VPANC. Neighboring VPANC information further includes channel quality measurement report for each neighboring VPANC of the VPANC and VPANC-ID for each neighboring VPANC.

Thus, VPANC information collected from VPANC 204 may include information on VPANC 206 (neighboring VPANC information), geo-location of VPANC 204, current load on VPANC 204, backhaul throughput configured for VPANC 204, and currently used backhaul throughput by VPANC 204. The information on VPANC 206 (which is the neighboring VPANC information) may include channel quality measurement report for VPANC 206 and VPANC-Identifier (ID) for VPANC 206. Similarly, VPANC information collected from VPANC 206 may include information on VPANC 204, geo-location of VPANC 206, current load on VPANC 206, backhaul throughput configured for VPANC 206, and currently used backhaul throughput by VPANC 206. The information on VPANC 204 (which is the neighboring VPANC information) may include channel quality measurement report for VPANC 204 and VPANC-ID for VPANC 204.

Using the VPANC information collected from VPANC 204 and VPANC 206, a VPANCC processor 216 in VPANCC 202 creates one or more channel scan parameters and one or more VPANC controlling parameters for VPANC 204 and VPANC 206. VPANCC processor 216 is a special purpose processor that additionally performs dead zone detection within its coverage area. VPANC controlling parameters that are created for a VPANC of the plurality of VPANCs are associated with VPANCs and dead zones neighboring the VPANC. For example, VPANC controlling parameters created for VPANC 204 are associated with VPANC 206 and dead zones in vicinity of VPANC 204. Similarly, VPANC controlling parameters created for VPANC 206 are associated with VPANC 204 and dead zones in vicinity of VPANC 206.

While VPANCC processor 216 maintains the above information by storing it in a control memory 218 within VPANCC 202. VPANCC processor 216 may communicate with control memory 218 using Access Persistent Memory (APM) path. VPANCC processor 216 uses the APM path to access (for read and write operation) the data stored in control memory 218. The APM path is a bi-directional interface and is capable of accessing individual elements stored in control memory 218.

VPANCC processor 216 instructs control memory 218 to store the one or more VPANC controlling parameters associated with the plurality of VPANCs. VPANC controlling parameters associated with a VPANC of the plurality of VPANCs include number of neighboring VPANCs of the VPANC, list of the neighboring VPANCs, geo-location of dead zones near the VPANC, and VPANC measurement reports associated with each neighboring VPANC. Thus, VPANC controlling parameters stored for VPANC 204 may include number of neighboring VPANCs of VPANC 204, i.e., 1, list of the neighboring VPANCs (this would include VPANC 206), geo-location of dead zones near VPANC 204, and VPANC measurement reports associated with VPANC 206 (neighboring VPANC of VPANC 204). Similarly, VPANC controlling parameters stored for VPANC 206 may include number of neighboring VPANCs of VPANC 206, i.e., 1, list of the neighboring VPANCs (this would include VPANC 204), geo-location of dead zones near VPANC 206, and VPANC measurement reports associated with VPANC 204 (neighboring VPANC of VPANC 206).

The list of neighboring VPANCs stored for a particular VPANC is used by that VPANC to perform channel scan and gather channel quality measurement for each neighboring VPANC in the list of neighboring VPANCs. Thus, this information stored for VPANC 204 may be used to collect channel quality measurement for VPANC 206. Similarly, such information stored for VPANC 206 may be used to collect channel quality measurement for VPANC 204.

Further, a VPANC measurement report associated with a neighboring VPANC of a VPANC includes VPANC-ID of the neighboring VPANC, channel quality of the neighboring VPANC as measured by the VPANC, geo-location of the neighboring VPANC, current load of the neighboring VPANC, backhaul throughput configured for the neighboring VPANC, and currently used backhaul throughput for the neighboring VPANC.

Thus, the VPANC controlling parameters stored for VPANC 204 in control memory 218 includes VPANC measurement report associated with VPANC 206 (neighboring VPANC of VPANC 204). This VPANC measurement report includes VPANC-ID of VPANC 206, channel quality of VPANC 206 as measured by VPANC 204, geo-location of VPANC 206, current load of VPANC 206, backhaul throughput configured for VPANC 206, and currently used backhaul throughput for VPANC 206. Similarly, the VPANC controlling parameters stored for VPANC 206 in control memory 218 includes VPANC measurement report associated with VPANC 204 (neighboring VPANC of VPANC 206). This VPANC measurement report includes VPANC-ID of VPANC 204, channel quality of VPANC 204 as measured by VPANC 206, geo-location of VPANC 204, current load of VPANC 204, backhaul throughput configured for VPANC 204, and currently used backhaul throughput for VPANC 204.

Based on channel quality of neighboring VPANCs, any neighboring VPANC for which the channel quality falls below a channel quality threshold may be removed from the list of the neighboring VPANCs. For example, if channel quality for VPANC 206 falls below the channel quality threshold, VPANC 206 is removed from the list of neighboring VPANCs stored for VPANC 204.

After creating the one or more channel scan parameters and the one or more VPANC controlling parameters, VPANCC processor 216 shares channel scan parameters and VPANC controlling parameters associated with one or more of the plurality of VPANCs with each of the plurality of VPANCs. In other words, VPANCC processor 216 shares channels scan parameters and VPANC controlling parameters created for VPANC 204, with VPANC 204 and channels scan parameters and VPANC controlling parameters created for VPANC 206, with VPANC 206.

Sharing channel scan parameters and VPANC controlling parameters with an associated VPANC, enables an EUD communicatively coupled to that VPANC to select a new VPANC from the plurality of VPANCs. In other words, channel scan parameters and VPANC controlling parameters shared with VPANC 204 enables EUD 208 and EUD 210 to select a new VPANC from the plurality of VPANCs. The new VPANC may be VPANC 206. This is further explained in conjunction with FIGS. 3 and 4 given below.

Figure 3:
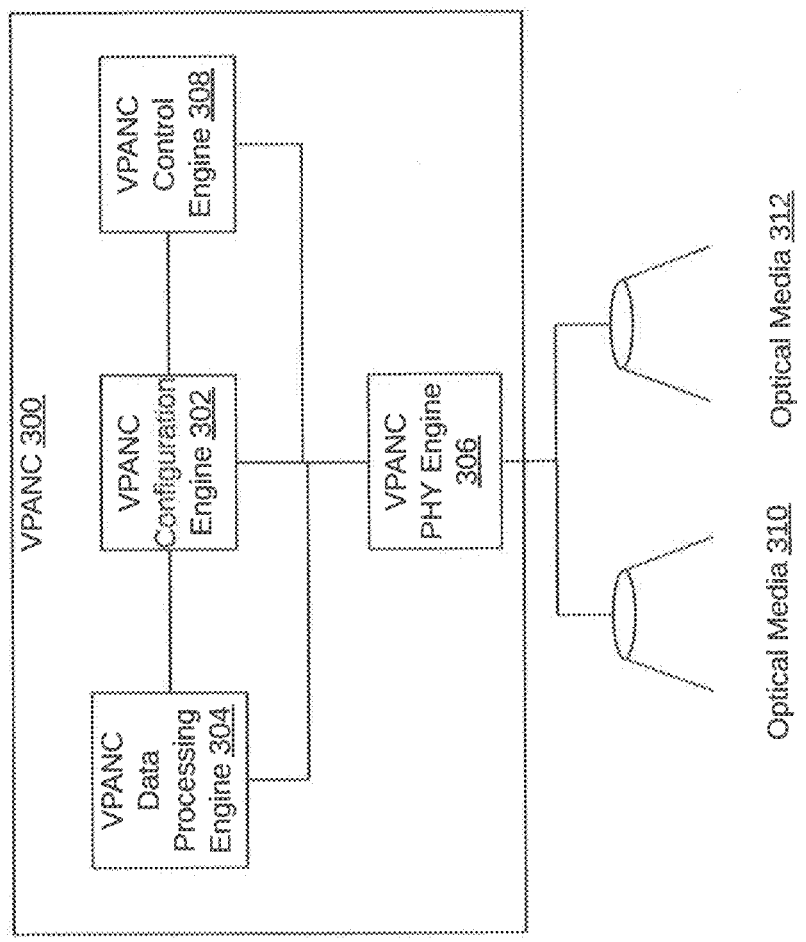
FIG. 3 is a block diagram illustrating various components of a VPANC, in accordance with an embodiment.
Figure 4:
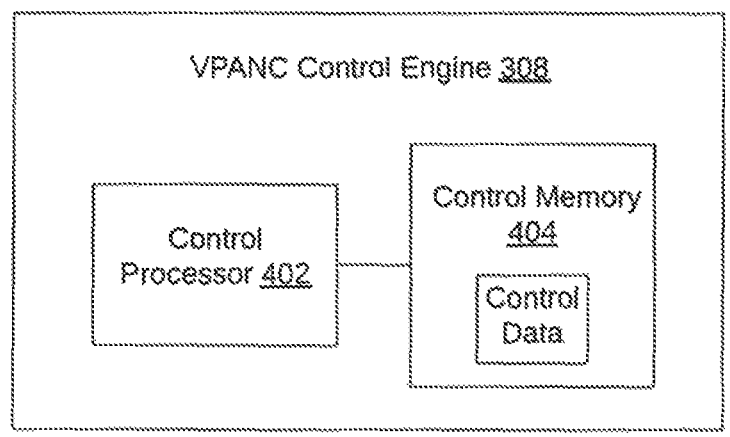
FIG. 4 is a block diagram illustrating various components of a VPANC control engine, in accordance with an embodiment.

Referring now to FIG. 3, a block diagram of various components of a VPANC 300 are illustrated, in accordance with an embodiment. VPANC 300 is analogous to both VPANC 204 and VPANC 206 illustrated in FIG. 2. VPANC 300 includes a VPANC configuration engine 302, a VPANC data processing engine 304, a VPANC PHY engine 306, and a VPANC control engine 308.

VPANC configuration engine 302 is responsible for configuration of VPANC 300. VPANC configuration engine 302 includes a memory and a processor (not shown in FIG. 3.) The memory is a non-volatile memory that stores the configuration data received from the OAM entity. The processor accesses the memory to retrieve configuration data and to configure each of VPANC data processing engine 304, VPANC PHY engine 306, and VPANC control engine 308 in VPANC 300. The additional functionalities performed by the processor in VPANC configuration engine 302 may include, but are not limited to receiving configuration parameters from the OAM entity and storing them in the memory at start up, bringing up and reconfiguring VPANC data processing engine 304, VPANC PHY engine 306, and VPANC control engine 308, updating feedback to the OAM entity to help the OAM entity change configuration parameters, if required. Other functionalities of VPANC configuration engine 302 are explained in detail in IEEE Standard 802.15.7™-2011, which is incorporated herein by reference.

VPANC data processing engine 304 carries user data for EUDs associated with VPANC 300. VPANC data processing engine 302 includes a processor and a memory. The processor in VPANC data processing engine 302 receives configuration data from VPANC configuration engine 302 and configures VPANC data processing engine 304. The processor sends/receives user data with the EUDs associated with VPANC 300. The data received from an EUD is sent towards external network by the processor and the data to be sent to the EUD is sent through VPANC PHY engine 306. The processor stores data in the memory, which is a volatile memory. Other functionalities of VPANC data processing engine 304 are explained in detail in IEEE Standard 802.15.7™-2011, which is incorporated herein by reference.

VPANC PHY engine 306 facilitates exchange of information between VPANC 300 and its various components with the EUDs associated with VPANC 300. Moreover, VPANC PHY engine 306 sends control data to an optical media 310 and an optical media 312, thereby controlling their functions. Optical media 310 and 312, for example, may be an LED lamp or a photo detector. Other functionalities of VPANC PHY engine 306 are explained in detail in IEEE Standard 802.15.7™-2011, which is incorporated herein by reference.

VPANC control engine 308 in VPANC 300 carries control messages for the EUDs associated with VPANC 300. VPANC control engine 308 includes a control processor that receives configuration data from VPANC configuration engine 302 to configure VPANC control engine 308. The control processor controls the connection with the EUDs associated with VPANC 300 and performs functionalities that may include, but are not limited to beacon control for synchronization with EUDs, association with the EUD, frame validation, disassociation, mobility control, and dimming support. The control processor creates a set of customized channel scan parameters and a VPANC selection policy for each EUD associated with VPANC 300. The set of customized channel scan parameters and the VPANC selection policy created for an EUD, is used by the EUD to select a new VPANC to associate with for future communication. The control processor stores the control data in a control memory. VPANC control engine 308, its functionalities, and the control data are explained in detail in conjunction with FIG. 4.

Referring now to FIG. 4, a block diagram illustrating various components of VPANC control engine 308 are disclosed, in accordance with an embodiment. VPANC control engine 308 includes a control processor 402 and a control memory 404, which includes control data. VPANC 300 requests channel scan parameters and the VPANC controlling parameters from VPANCC 202. The channel scan parameters and the VPANC controlling parameters are created by VPANCC 202 for VPANC 300 based on VPANC information received from a plurality of VPANCs that includes VPANC 300. The channel scan parameters and the VPANC controlling parameters have been explained in detail in conjunction with FIG. 2. In an exemplary embodiment, VPANC 300 sends a "VPANC_VPANCC_COORDINATED_CONFIG_REQ" message to VPANCC 202 to request the channel scan parameters and the VPANC controlling parameters. In response, VPANCC 202 sends a "VPANCC_VPANC_COORDINATED_CONFIG_RES" message.

VPANC 300 also requests EUD information from each of the plurality of EUDs associated with VPANC 300 The EUD information associated with an EUD includes geo-location of the EUD and channel quality measurement reports for neighboring VPANCs of the EUD. By way of an example, when EUD information is received by VPANC 204 from EUD 210, the EUD information would include geo-location of EUD 210 and channel quality measurement report for VPANC 206, which is neighboring VPANC for EUD 210. In an exemplary embodiment, VPANC 300 sends a "VPANC_EUD_CHANNEL_MEASURE_REQ" message to an EUD to request EUD information.

Based on the channel scan parameters, the VPANC controlling parameters, and the EUD information, control processor 402 creates a set of customized channel scan parameters and a VPANC selection policy for each of the plurality of EUDs. A VPANC selection policy created for an EUD includes number of candidate VPANCs, list of the candidate VPANCs, and VPANC candidate parameters associated with each candidate VPANC in the list of candidate VPANCs. Further, VPANC candidate parameters for a candidate VPANC in the list of candidate VPANCs includes a candidate VPANC-Identifier (ID) of the candidate VPANC, geo-location of the candidate VPANC, geo-location of dead zones near the candidate VPANC, current load on the candidate VPANC, backhaul configured for the candidate VPANC, and backhaul currently used by the candidate VPANC.

Control processor 402 then stores control data in control memory 404. The control data may include, but is not limited to geo-location of VPANC 300, number of EUDs associated with VPANC 300, list of the EUDs associated with VPANC 300, default VPANC selection policy, geo-location of a requester EUD associated with VPANC 300, distance between two or more EUDs In the list of EUDs, a threshold distance between the requested EUD and an EUD from the list of associated EUDs, and EUD parameters associated with the plurality of EUDs. EUD parameters associated with an EUD of the plurality of EUDs includes geo-location of the EUD, a set of customized channel scan parameters created for the EUD, channel quality of neighboring VPANCs of the EUD, a channel quality threshold for neighboring VPANCs, and a VPANC selection policy created for the EUD.

Thereafter, control processor 402 shares with each EUD of the plurality of EUDs, an associated set of customized channel scan parameters and VPANC selection policy. In an exemplary embodiment, control processor sends this information to an EUD through "VPANC_EUD_CONFIG_RES" message. An EUD uses a set of customized channel scan parameters and a VPANC selection policy to select a candidate VPANC from the list of candidate VPANCs to associate with for future communication.

Figure 5:
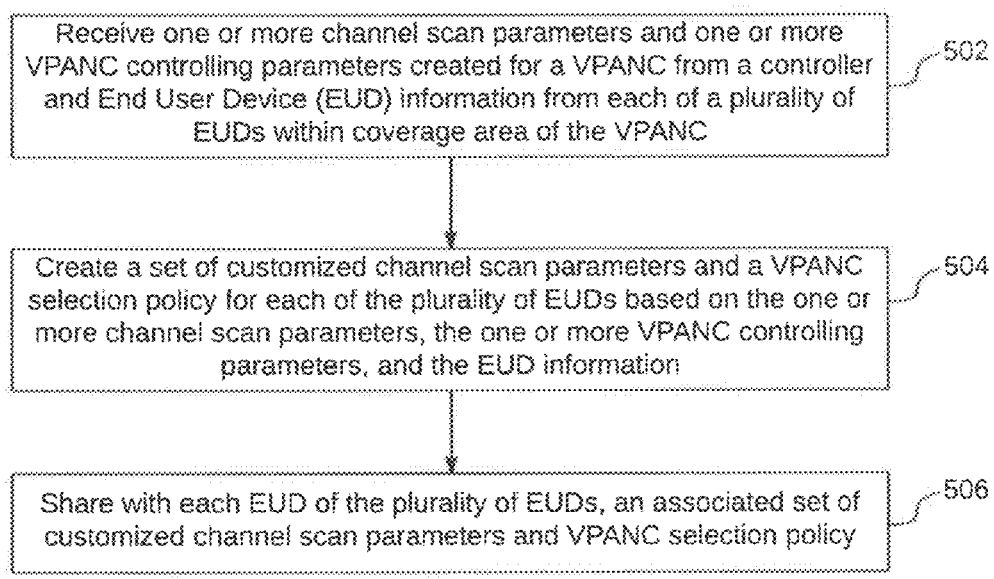
FIG. 5 illustrates a flowchart of a method for selecting VPANCs, in accordance with an embodiment.

Referring now to FIG. 5, a flowchart of a method for selecting VPANCs is illustrated, in accordance with an embodiment. To this end, VPANC 300 requests EUD information from each of the plurality of EUDs associated with VPANC 300. By way of an example, VPANC 204 may request EUD information from both EUD 208 and EUD 210. EUD information for an EUD may include, but is not limited to geo-location of the EUD and channel quality measurement reports for neighboring VPANCs of the EUD. VPANC 300 also requests channel scan parameters and VPANC controlling parameters created by VPANCC 202 for VPANC 300.

At 502, VPANC 300 receives channel scan parameters and VPANC controlling parameters created for it from VPANCC 202 and EUD information from each of the plurality of EUDs within its coverage area. Thereafter, based on the received information, control processor 402 creates, at 504, a set of customized channel scan parameters and a VPANC selection policy for each of the plurality of EUDs.

Control processor 402 then stores control data in control memory 404 of VPANC control engine 308. In an exemplary embodiment, control data stored in control memory 404 includes the following:

Geo-location of a VPANC
  This represent own geo-location of the VPANC and is used to create one or more VPANC selection policy and customized channel scan parameters for each of the plurality of EUDs associated with the VPANC. This may be represented as:
  $VPANC_{geoloc}$ Default VPANC selection policy
  This is the VPANC selection policy received from the OAM entity. Control processor 402 used the default VPANC selection policy to create VPANC selection policy for each of the plurality of EUDs. This may be represented as:
  $VPANSP_{default}$ Stale timer
  The stale timer is used to check whether customized channel scan parameters and VPANC selection policy created for a specific EUD is still relevant or not. The value for stale timer is received from the OAM entity. The stale timer may be represented as:
  $timer_{VPANCstale}$ Geo-location of a requester EUD
  This geo-location of an EUD that is requesting for customized channel scan parameters and VPANC selection policy created for it. The geo-location is used to create the customized channel scan parameters and VPANC selection policy for the EUD. This may be represented as:

$EUD_{geoloc\_requester}$

Distance between EUDs associated with a VPANC

This is the distance between two EUDs and is calculated using geo-location of the two EUDs. This distance may be represented as:

$Distance_{EudReg\_EudAssoc}$

Threshold distance between a requested EUD and another EUD associated with the VPANC This is the threshold value in terms of distance between an EUD associated with the VPANC and the requester EUD. This threshold distance is used to determine whether measurement report from the associated EUD is valid or not. The threshold distance may be represented as:

$ThresholdDistance_{EudReq\_EudAssoc}$

Threshold of channel quality

This is the threshold value in terms of channel quality of a neighboring VPANC of an associated EUD as measured by the associated EUD. This threshold value is used to determine whether the neighboring VPANC should be considered as a candidate VPANC. This threshold may be represented as:

$ThresholdNeighborVPANC_{ChQualEud}$

List of EUDs associated with the VPANC

This is the list of EUDs that are already associated with the VPANC. This may be represented as:

AssociatedEUDList<1, 2 . . . n> where,

'n' is the total number of EUDs associated with the VPANC

Number of EUDs associated with the VPANC

This is the number of entries in AssociatedEUDList and may be represented as:

NumberOfEUDs

For each entry in the AssociatedEUDList, EUD parameters are maintained. These EUD parameters are depicted in Table 1 given below. For each of these EUD parameters value of 'i' ranges from 0 to NumberOfEUDs.

TABLE 1

| EUD Parameter | Description |
| --- | --- |
| Geo-location of an EUD | This is the geo-location of the EUD and is used by control processor 402 to create customized channel scan parameters and the VPANC selection policy by the EUD. The geo-location of an EUD may be represented as: $EUD_{geoloc\_j}$ |
| Customized Channel scan parameters for an EUD | These are the channel scan parameters for an EUD after they have been customized for that EUD by control processor 402 based on channel quality measuremen and geo-location associated with the EUD and geo-location of the, requester EUD. The customized channel scan parameters are provided to the requester EUD and enables the requester EUD to perform channel scanning. For an $i^{th}$ EUD, this may be represented as: $CCSP_i$. For a current EUD under consideration, $CCSP_i$ is represented as: $CCSP_{cand}$ |
| Channel quality of a neighboring VPANC of an EUD | For each neighboring VPANC entry in $CCSP_i$ associated with an EUD, the channel quality of a neighboring VPANC is given by this EUD parameter. This information is recieved from the EUD through an 'EUD_VPANC_CHANNEL_MEASURE_RES' message. |

TABLE 1-continued

| EUD Parameter | Description |
| --- | --- |
| | The channel quality of a neighboring VPANC may be represented as: $NeghborVPANC_{ChQualEud\_lj}$ where, 'j' ranges from 1 to total number of neighboring VPANCs of the EUD |
| VPANC selection policy for an EUD | This is the VPANC selection policy formed by control processor 402 based on VPANC control parameters received from VPANCC 202 and geo-location of requester EUD. The VPANC selection policy is provided to the requester EUD and enables the requester EUD to select a suitable VPANC from a list of available VPANCs, which is obtained when the requester EUD performs channel scan using the customized channel scan parameters created for the requester EUD. VPANC selection policy for $i^{th}$ EUD may be represented as: $VPANSP_i$ For the current EUD under consideration, $VPANSP_i$ is represented as $VPANSP_{cand}$. The $VPANSP_{cand}$ further includes parameters given in table 2. |

TABLE 2

| $VPANSP_{cand}$ parameter | Description |
| --- | --- |
| List of candidate VPANCs | This is the list of all VPANCs which can be considered for new association by the current EUD. For each candidate VPANC in this list, suitability requirement parameters or example, geo-location of the candidate VPANC, current load on the candidate VPANC, dead zone around the candidate VPANC, are maintained. These are given in detail in table 3. These suitability requirement parameters are provided to the current EUD (the requester EUD). This list may be represented as: CandidateVPANCList<1, 2, . . ., k> where, 'k' is the total number of candidate VPANCS in the list |
| Number of candidate VPANCs in the list of candidate VPANCs | This is the total number of candidate VPANCs in the Candidate VPANCList. This may be represented as: NumberCandidateVpanc |

TABLE 3

| Suitability Requirement Parameter | Description |
| --- | --- |
| Candidate VPANC ID | This is the VPANC ID of a candidate VPANC. This ID is used to identify the candidate VPANC and may be represented as: $VPANC\_cand_{ID}$ |
| Geo-location of a candidate VPANC | This is the geo-location of a candidate VPANC. This information is provided to a requester EUD and is used by the requester EUD to check suitability of the candidate VPANC. This may be represented as. $VPANC\_cand_{geoloc}$ |
| Geo-location of dead-zones present near a candidate VPANC | This is geo-location of dead-zones present near a candidate VPANC. This information is used by an EUD to detect availability of Li-Fi connection and may be represented as: $VPANC\_cand_{DeadZone}$ |
| Current load on a candidate VPANC | This is the current bad on a candidate VPANC. This information is provided to a requester EUD and us used by the requester EUD to check suitability of the candidate VPANC for a future association. The current load on a candidate VPANC may be represented as: $VPANC\_cand_{load}$ |

TABLE 3-continued

| Suitability Requirement Parameter | Description |
|---|---|
| Configured back haul throughput for a candidate VPANC | This is the backhaul throughput configured for a candidate VPANC. This information is used by the requester EUD to check suitability the candidate VPANC. This may be represented as: VPANC_cand$_{configTp}$ |
| Currently used back haul throughput for a candidate VPANC | This is the backhaul throughput that is currently use by the candidate VPANC. This information is used by the requester EUD to check suitability of the candidate VPANC. This may be represented as: VPANC_cand$_{usedTp}$ |

At 506, VPANC 300 shares an associated set of customized channel scan parameters and VPANC selection policy with each EUD of the plurality of EUDs. By way of an example, VPANC 204 shares with EUD 208, the set of customized channel scan parameters and the VPANC selection policy created for EUD 208. Similarly, VPANC 204 shares with EUD 210, the set of customized channel scan parameters and the VPANC selection policy created for EUD 210.

Thereafter, an EUD uses the set of customized channel scan parameters and the VPANC selection policy to select a candidate VPANC form the list of candidate VPANC. The EUD then associates with the candidate VPANC so selected. In an embodiment, after the EUD receives the set of customized channel scan parameters and the VPANC selection policy from a current VPANC the EUD is associated with, the EUD assesses quality of an active channel associated with the current VPANC that is currently being used by the EUD for communication. The EUD may performs the quality assessment by comparing quality of the active channel currently used by the EUD with a predefined channel quality threshold after expiry of a periodic channel assessing timer. When the quality of the active channel currently used by the EUD is below the predefined channel quality threshold, the EUD switches to the new VPANC using the VPANC selection policy.

Figure 6:
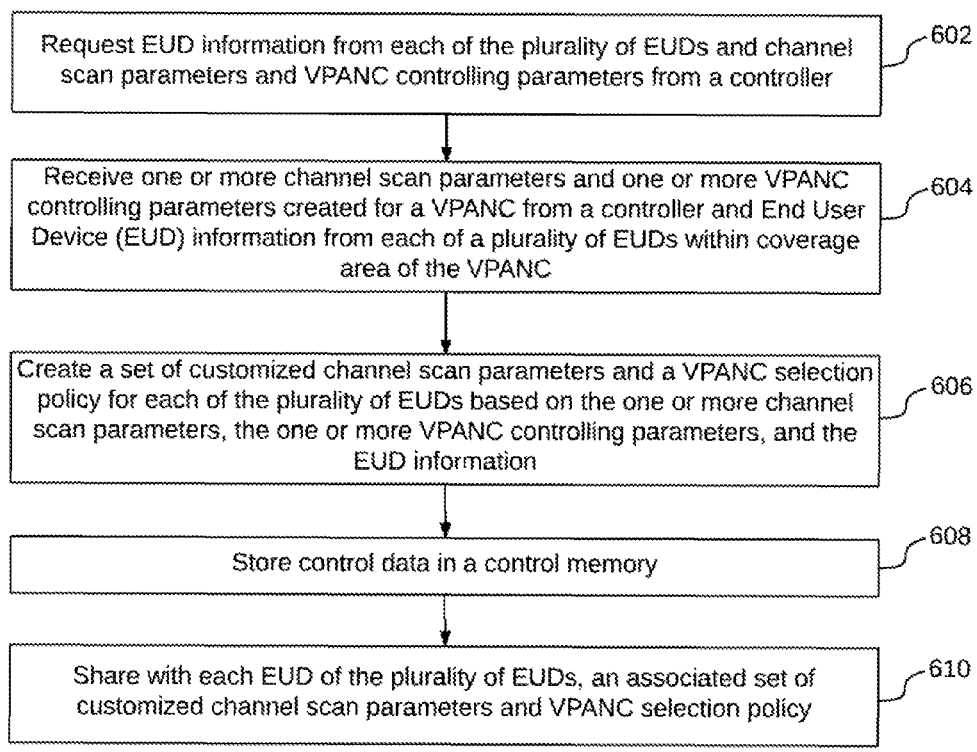
FIG. 6 illustrates a flowchart of a method for selecting VPANCs, in accordance with another embodiment.

Referring now to FIG. 6, a flowchart of a method for selecting VPANCs is illustrated, in accordance with an embodiment. At 602, VPANC 300 requests EUD information from each of a plurality of EUDs associated with VPANC 300. VPANC 300 additionally requests channel scan parameters and VPANC controlling parameters from VPANCC 202. At 604, VPANC 300 receives the channel scan parameters and the VPANC controlling parameters created by VPANCC 202 for VPANC 300 and EUD information from each of the plurality of EUDs. This has been explained in detail in conjunction with FIG. 5.

Based on the channel scan parameters, the VPANC controlling parameters, and the EUD information, control processor 402 creates, at 606, a set of customized channel scan parameters and a VPANC selection policy for each of the plurality of EUD. Thereafter, at 608, control processor 402 stores control data in control memory 404. The control data has been explained in detail in conjunction with FIG. 5. At 610, VPANC 300 shares an associated set of customized channel scan parameters and VPANC selection policy with each EUD of the plurality of EUDs. Based on this, an EUD selects a candidate VPANC from the list of candidate VPANCs to associate with for future communication. This has been explained in detail in conjunction with FIG. 5.

Figure 7:
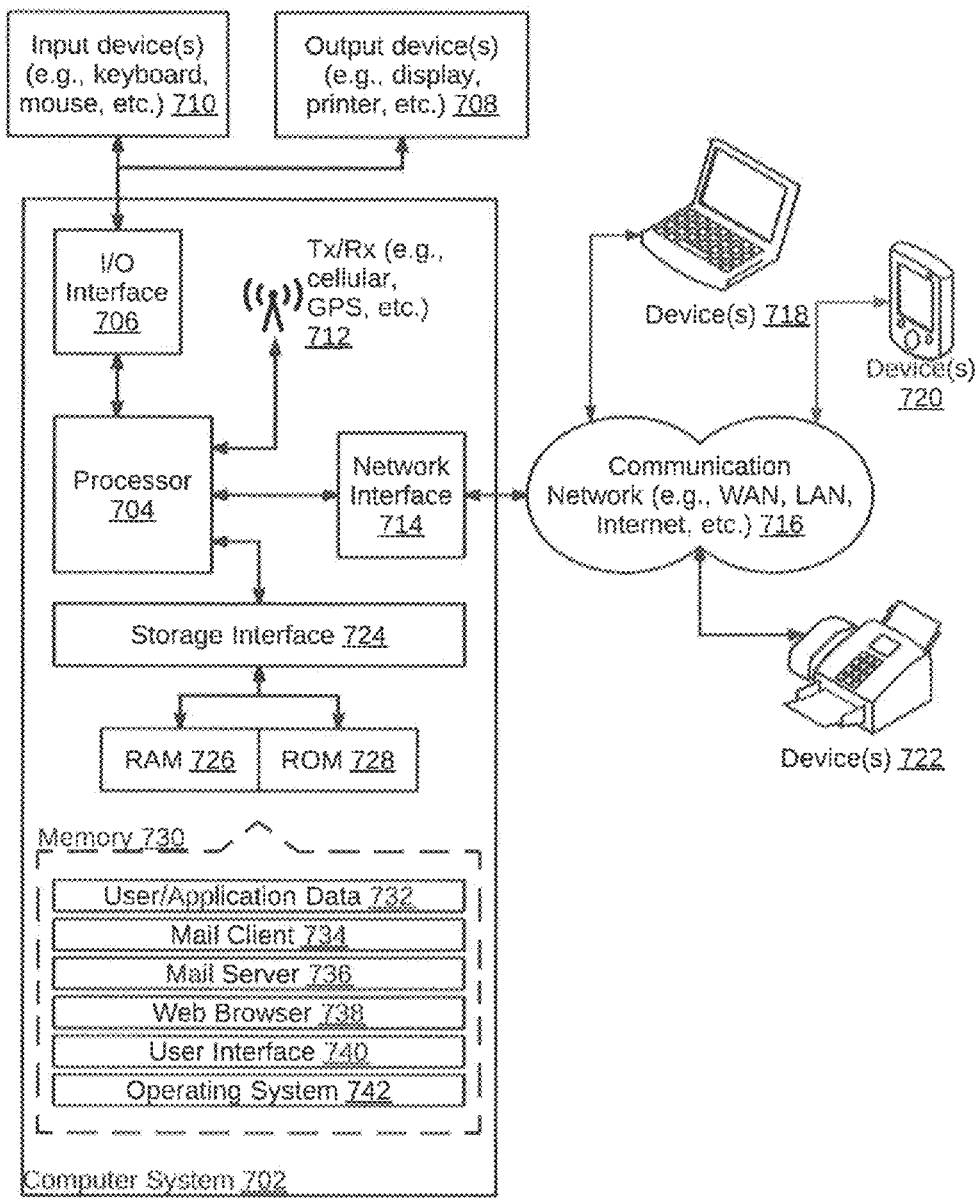
FIG. 7 illustrates a block diagram of an exemplary computer system for implementing various embodiment is illustrated.

Referring now to FIG. 7, a block diagram of an exemplary computer system for implementing various embodiment is illustrated. Computer system 702 may comprise a central processing unit ("CPU" or "processor") 704. Processor 704 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE). WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 710 may be a printer, fax machine, video display (e.g., cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (e.g., using Wireless Application Protocol), the Internet, etc. Using network interface 716 and communication network 714, computer system 702 may communicate with devices 718, 720, and 722. These devices may include, without limitation, personal computer(s), server(s), fax machines, printers, scanners, various mobile devices such as cellular telephones, smartphones (e.g., Apple iPhone, Blackberry. Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 702 may itself embody one or more of these devices.

In some embodiments, processor 704 may be disposed in communication with one or more memory devices (e.g., RAM 726, ROM 728, etc.) via a storage interface 724. Storage interface 724 may connect to memory devices 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 730 may store a collection of program or database components, including, without limitation, an operating system 732, a user interface application 734, a web browser 736, a mail server 738, a mail client 740, a user/application data 742 (e.g., any data variables or data records discussed in this disclosure), etc. Operating system 732 may facilitate resource management and operation of the computer system 702. Examples of operating system 732 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 702 may implement web browser 736 stored program component. Web browser 736 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 702 may implement mail server 738 stored program component. Mail server 738 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement mail client 740 stored program component. Mail client 740 may be a mail viewing application, such as Apple Mail, Microsoft Entourage, Microsoft Outlook, Mozilla Thunderbird, etc.

In some embodiments, computer system 702 may store user/application data 742, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide a VPANC and associated method for selecting suitable VPANCs. The VPANC and the associated method resolve a number of drawbacks in existing solutions. These drawbacks include, but are not limited to delay in channel scan, unnecessary power consumption by an EUD due to wrong channel scan, unsuitable selection of VPANC, incomplete channel scan for the EUD in case of shorter channel scan duration, increased power consumption in the EUD in case of longer channel scan duration, selection of an unsuitable VPAN having poor quality channel that will affect throughput for an end user, limited mobility within the VPAN, and drop in connection due to dead zones between two VPANs.

The specification has described VPANC and associated method for selecting suitable VPANCs. The illustrated steps are set out to explain the exemplary embodiments shown, and it should be anticipated that ongoing technological development will change the manner in which particular functions are performed. These examples are presented herein for purposes of Illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for selecting Visible light communication Personal Area Network Coordinators (VPANCs), the method comprising:
    receiving, by a VPANC, channel scan parameters and VPANC controlling parameters created for the VPANC from a controller and End User Devices (EUD) information from each of a plurality of EUDs associated with the VPANC, wherein the channel scan parameters and the VPANC controlling parameters are created by the controller based on VPANC information received from a plurality of VPANCs that includes the VPANC, the VPANC controlling parameters are associated with VPANCs and dead zones neighboring the VPANC;
    creating, by the VPANC, a set of customized channel scan parameters and a VPANC selection policy for each of the plurality of EUDs based on the channel scan parameters, the VPANC controlling parameters, and the EUD information; and
    sharing, by the VPANC, with each EUD of the plurality of EUDs, an associated set of customized channel scan parameters and VPANC selection policy, wherein sharing enables an EUD to select a new VPANC from the plurality of VPANCs.

2. The method of claim 1 further comprising requesting, by the VPANC:
    the EUD information from each of the plurality of EUDs; and
    the channel scan parameters and the VPANC controlling parameters from the controller.

3. The method of claim 1, wherein EUD information associated with an EUD of the plurality of EUDs comprises geo-location of the EUD and channel quality measurement reports for neighboring VPANCs of the EUD.

4. The method of claim 1 further comprising storing control data comprising geo-location of the VPANC, number of EUDs associated with the VPANC, list of the EUDs associated with the VPANC, default VPANC selection policy, geo-location of a requester EUD associated with the VPANC, distance between two or more EUDs in the list of EUDs, a threshold distance between a requested EUD and an EUD from the list of associated EUDs, and EUD parameters associated with the plurality of EUDs.

5. The method of claim 2 further comprising discarding the channel quality measurement reports of the EUD information associated with an EUD of the plurality of EUDs, when distance between a requester EUD and the EUD of the plurality of EUDs is more than a threshold distance.

6. The method of claim 4, wherein EUD parameters associated with an EUD of the plurality of EUDs comprises geo-location of the EUD, a set of customized channel scan parameters created for the EUD, channel quality of neighboring VPANCs of the EUD, a channel quality threshold for neighboring VPANCs, and a VPANC selection policy created for the EUD.

7. The method of claim 6 further comprising considering a neighboring VPANC as a candidate VPANC, when channel quality measured for the neighboring VPANC is greater than the channel quality threshold.

8. The method of claim 6, wherein the VPANC selection policy created for the EUD comprises number of candidate VPANCs, list of the candidate VPANCs, and suitability requirement parameters associated with each candidate VPANC in the list of candidate VPANCs.

9. The method of claim 8, wherein suitability requirement parameters for a candidate VPANC in the list of candidate VPANCs comprises a candidate VPANC-Identifier (ID) of the candidate VPANC, geo-location of the candidate VPANC, geo-location of dead zones near the candidate VPANC, current load on the candidate VPANC, backhaul configured for the candidate VPANC, and backhaul currently used by the candidate VPANC.

10. The method of claim 1 further comprising providing, by the VPANC, to the controller VPANC information associated with the VPANC.

11. The method of claim 10, wherein VPANC information collected from the VPANC comprises information associated with neighboring VPANC of the VPANC, geo-location of the VPANC, current load on the VPANC, backhaul throughput configured for the VPANC, and currently used backhaul throughput by the VPANC.

12. The method of claim 1, wherein the VPANC controlling parameters associated with the VPANC comprises number of neighboring VPANCs of the VPANC, list of the neighboring VPANCs, geo-location of dead zones near the VPANC, and VPANC measurement reports associated with each neighboring VPANC.

13. A Visible light communication Personal Area Network Coordinator (VPANC) in a Light Fidelity (Li-Fi) network, the VPANC comprising:
    a network interface communicatively coupled to a controller and a plurality of End User Devices (EUDs);
    a processor; and
    a memory storing instructions that, when executed, cause the processor to perform operations comprising:
        receiving channel scan parameters and VPANC controlling parameters created for the VPANC from a controller and EUD information from each of a plurality of EUDs associated with the VPANC, wherein the channel scan parameters and the VPANC controlling parameters are created by the controller based on VPANC information received from a plurality of VPANCs that includes the VPANC, the VPANC controlling parameters are associated with VPANCs and dead zones neighboring the VPANC;
        creating a set of customized channel scan parameters and a VPANC selection policy for each of the plurality of EUDs based on the channel scan parameters, the VPANC controlling parameters, and the EUD information; and sharing with each EUD of the plurality of EUDs, an associated set of customized channel scan parameters and VPANC selection policy, wherein sharing enables an EUD to select a new VPANC from the plurality of VPANCs.

14. The VPANC of claim 13, wherein the operations further comprise requesting, by the VPANC:

the EUD information from each of the plurality of EUDs; and the channel scan parameters and the VPANC controlling parameters from the controller.

15. The VPANC of claim 13, wherein EUD information associated with an EUD of the plurality of EUDs comprises geo-location of the EUD and channel quality measurement reports for neighboring VPANCs of the EUD.

16. The VPANC of claim 13, wherein the operations further comprise storing control data comprising geo-location of the VPANC, number of EUDs associated with the VPANC, list of the EUDs associated with the VPANC, default VPANC selection policy, geo-location of a requester EUD associated with the VPANC, distance between two or more EUDs in the list of EUDs, a threshold distance between a requested EUD and an EUD from the list of associated EUDs, and EUD parameters associated with the plurality of EUDs.

17. The VPANC of claim 15, wherein the operations further comprise discarding the channel quality measurement reports of the EUD information associated with an EUD of the plurality of EUDs, when distance between a requester EUD and the EUD of the plurality of EUDs is more than a threshold distance.

18. The VPANC of claim 17, wherein EUD parameters associated with an EUD of the plurality of EUDs comprises geo-location of the EUD, a set of customized channel scan parameters created for the EUD, channel quality of neighboring VPANCs of the EUD, a channel quality threshold for neighboring VPANCs, and a VPANC selection policy created for the EUD.

19. The VPANC of claim 18, wherein the operations further comprise considering a neighboring VPANC as a candidate VPANC, when channel quality measured for the neighboring VPANC is greater than the channel quality threshold.

20. The VPANC of claim 18, wherein the VPANC selection policy created for the EUD comprises number of candidate VPANCs, list of the candidate VPANCs, and suitability requirement parameters associated with each candidate VPANC in the list of candidate VPANC.

21. A non-transitory computer-readable storage medium having stored thereon, a set of computer-executable instructions for selecting Visible light communication Personal Area Network Coordinators (VPANCs), causing a computer comprising one or more processors to perform steps comprising:

receiving channel scan parameters and VPANC controlling parameters created for the VPANC from a controller and EUD information from each of a plurality of EUDs associated the VPANC, wherein the channel scan parameters and the VPANC controlling parameters are created by the controller based on VPANC information received from a plurality of VPANCs that includes the VPANC, the VPANC controlling parameters are associated with VPANCs and dead zones neighboring the VPANC;

creating a set of customized channel scan parameters and a VPANC selection policy for each of the plurality of EUDs based on the channel scan parameters, the VPANC controlling parameters, and the EUD information; and sharing with each EUD of the plurality of EUDs, an associated set of customized channel scan parameters, and the EUD information; and sharing with each EUD of the plurality of EUDs, an associates set of customized channel scan parameters and VPANC selection policy, wherein sharing enables an EUD to select a new VPANC from the plurality if VPANCs.

\* \* \* \* \*